Feb. 18, 1969 R. K. SHELBY ET AL 3,428,238
PLASTIC CONTAINERS
Filed May 2, 1966 Sheet 1 of 4

INVENTORS
RICHARD K. SHELBY
JAY W. RAPP
BY
*Robert J. Schaap*
ATTORNEY

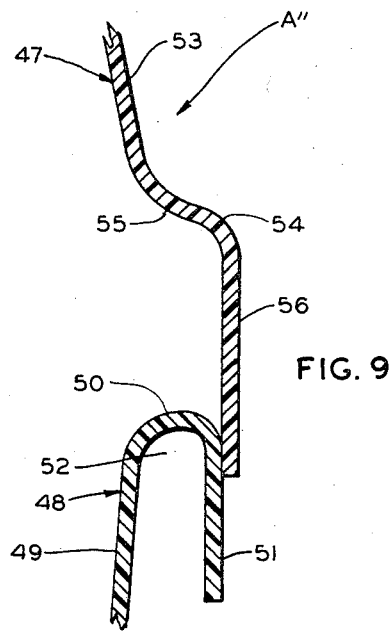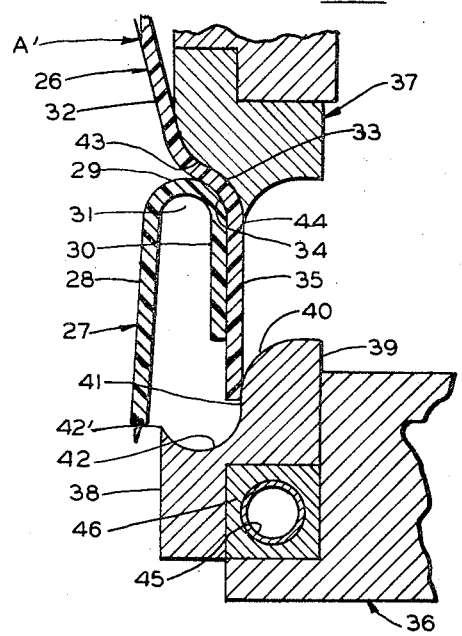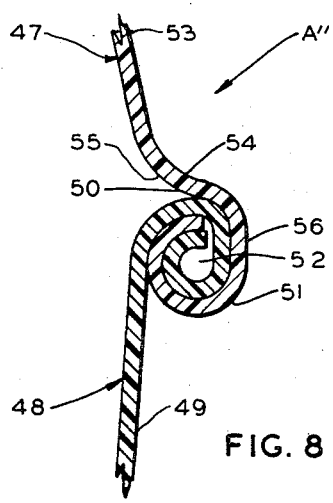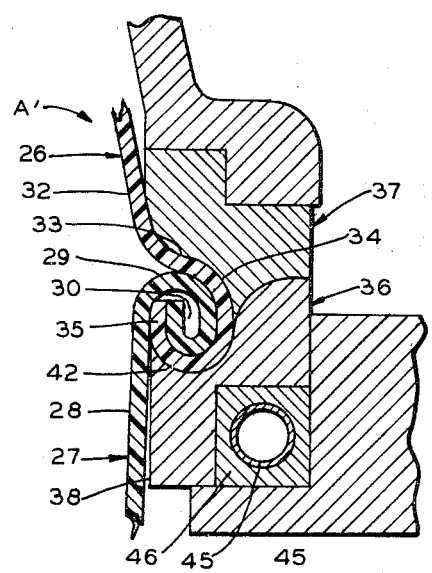
FIG. 9
FIG. 10
FIG. 8
FIG. 11
INVENTORS
RICHARD K. SHELBY
JAY W. RAPP
BY
Robert J. Schaap
ATTORNEY

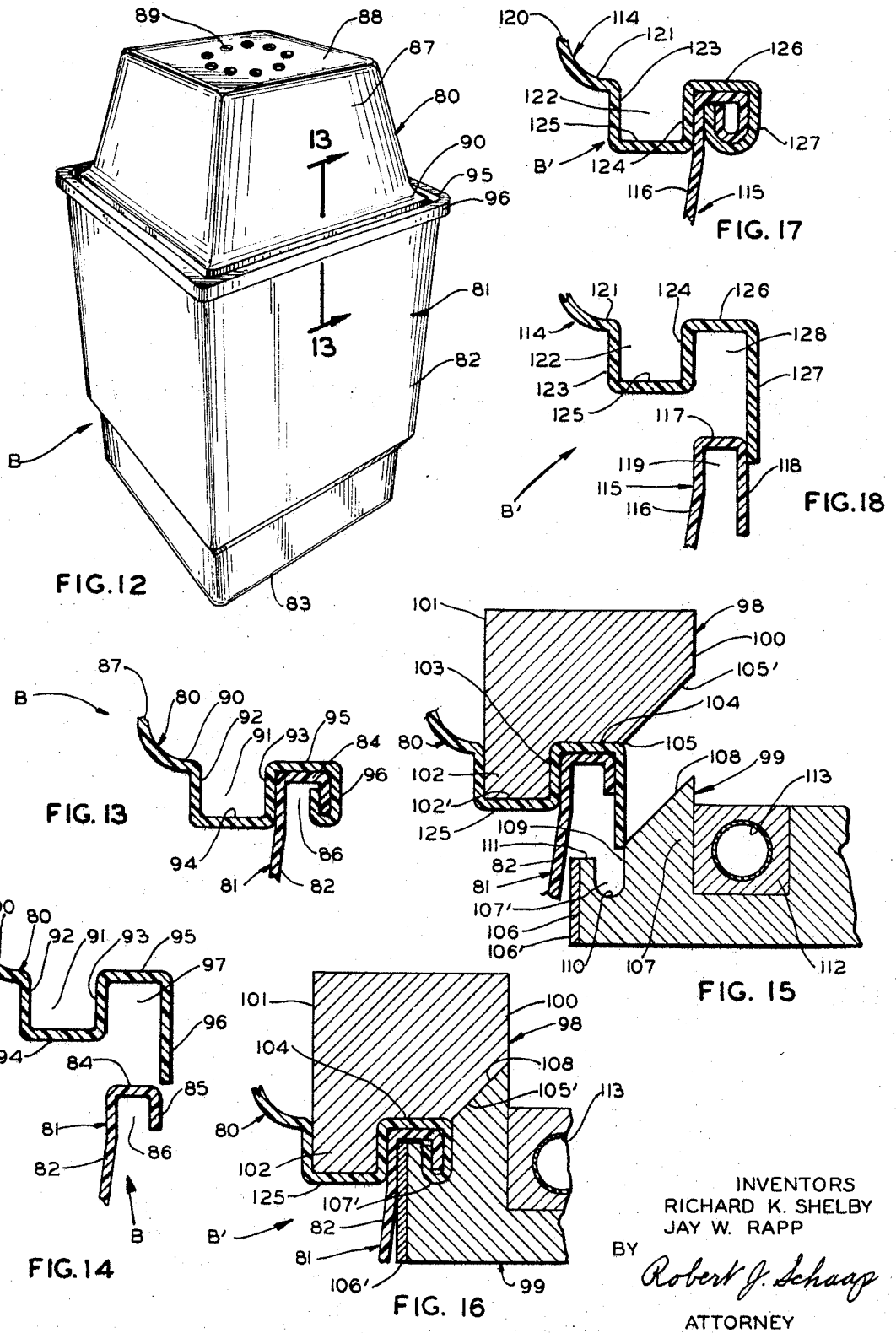

Feb. 18, 1969  R. K. SHELBY ET AL  3,428,238
PLASTIC CONTAINERS
Filed May 2, 1966  Sheet 4 of 4

INVENTORS
RICHARD K. SHELBY
JAY W. RAPP
BY
*Robert J. Schaap*
ATTORNEY 3,428,238
PLASTIC CONTAINERS
Richard K. Shelby, Chicago, and Jay W. Rapp, Park
Ridge, Ill., assignors to Monsanto Company, St.
Louis, Mo., a corporation of Delaware
Filed May 2, 1966, Ser. No. 546,990
U.S. Cl. 229—5.6                                    25 Claims
Int. Cl. B65d 3/10, 11/20

ABSTRACT OF THE DISCLOSURE

A two-piece plastic container which comprises a receptacle portion and a cover member. Each of these sections has outwardly flaring rims and downwardly extending flanges. In one embodiment of the invention the flange of the cover member frictionally engages the flange of the receptacle and is provided with an upwardly struck member which is fitted into a groove on the receptacle. In one embodiment, the flange on the cover member is spaced from the wall of the receptacle. In another embodiment, both the flanges on the receptacle and cover member have upwardly struck portions which are fitted into the groove on the receptacle. In this embodiment, the upwardly struck portions engage the wall of the receptacle. In a third embodiment, the reversely bent portions are curled so they become horizontally disposed. The present invention covers both containers which are circular in horizontal cross section and which are rectangular in horizontal cross section. The rectangular containers are provided with a U-shaped reinforcing groove.

---

This invention relates in general to certain new and useful improvements in plastic containers and more particularly to two-pieces nestable sections of plastic containers which are secured to form a unitary structure.

Today, plastics and synthetic resin materials have found widespread use in the packaging industry because of the inexpensiveness of the raw material and the mass production methods of manufacturing. Plastic containers have been rapidly replacing both metal and paperboard containers inasmuch as the plastic type of container can be readily molded in an inexpensive mass production operation. Moreover, containers formed of plastic and synthetic resinous materials are adapted to be hermetically sealed and are capable of holding fine powders and low viscosity liquids.

The use of plastic as a material for the manufacture of nestable containers such as drinking cups and the like has met with widespread success inasmuch as the nestable items are capable of being shipped for large distances without absorbing large transportation costs. However, sealed containers, such as powder cans and the like, which are non-nestable, cannot be stacked in small packages and consequently consume a great deal of shipping space. While large shipping cases of non-nestable containers do not have a great mass, they do have a great bulk and this bulk consumes a great deal of expense in transportation. Inasmuch as the non-nestable containers must absorb this considerable transportation cost, they have been usually limited to within approximately 150 mile radius from the source of manufacture. As a result thereof, the marketing of non-nestable containers and more particularly, non-nestable plastic containers has been seriously hampered.

In an effort to obviate the difficulty of the non-nestable container, various manufacturers and producers of containers have resorted to two-piece nestable sections which are ultimately formed or connected into a unitary structure. The manufacturers of metal containers, such as powder cans, now produce nestable container portions with nestable cover members which can be shipped for large distances. At their destination, the cover member can be secured to or hermetically sealed to the container portion by a conventional crimping mechanism. Plastic articles are not capable of being connected by this type of operation and manufacturers of two-piece nestable plastic sections have resorted to the use of cement and similar methods of fusion. However, there is no convenient method of sealing two-section nestable containers into a unitary structure at their destination in a mass-production operation. The methods presently employed require the packager using the nestable containers to install the necessary equipment for performing the sealing operations. However, the equipment presently available is relatively expensive and the labor time consumed in order to perform the necessary operations is quite considerable. Due to this expense, many of the users of sealed containers have shifted to containers being formed of other materials.

There have been some attempts to secure the upper and lower sections of some plastic containers by heat sealing. However, these attempts have proved to be unsuccessful and commercially unfeasible. When the two sections of the containers were heat sealed, a reorientation of the plastic material along the joint would take place. The reorientation of the molecules would cause a dimensional change which, in turn, materially interfered with the maintenance of a proper heat seal. Consequently, the two sections of the container were not properly and permanently adjoined with a fluid-tight seal. There have also been attempts to seal upper and lower sections of some plastic containers by depositing a liquid plastic or dope to cause a semi-fluid surface on the container sections. The dopes generally cause a redissolving of the plastic material, which was then ultimately rigidified. However, this type of process is not particularly effective since many of the plastic materials such as polystyrene cannot be liquified and are not readily made flexible by dissolving a portion of the surface in a solvent. Furthermore, the application of the liquid dope or solvent often caused dimensional changes in the plastic material, thereby causing an improper fit of the two sections.

It is, therefore, the primary object of the present invention to provide multiple-piece plastic containers which can be readily sealed into a unitary structure.

It is another object of the present invention to provide an economical method of sealing multiple-piece plastic containers, which method is relatively inexpensive, rapid and efficient.

It is a further object of the present invention to provide multiple-piece plastic containers of the type stated where the various sections can be nested for shipment and where securement can be readily and conveniently performed at their destination.

It is also an object of the present invention to produce thin-walled containers of the type stated which are disposable and can be mass-produced at a relatively low per unit cost.

It is another salient object of the present invention to provide plastic containers of the type stated which are capable of withstanding the abuse normally subjected to such type of containers.

With the above and other objects in view, our invention resides in the novel features of form, construction, arrangement and combination of parts presently described and pointed out.

In the accompanying drawings:

FIGURES 4 and 5 are sequential enlarged sectional views showing the method of sealing the cover member of FIGURE 3 to the receptacle of FIGURE 3 in accordance with the present invention of which:

FIGURE 4 illustrates the dies which are used to seal the cover member to the receptacle and showing the cover member and receptacle in a separated position;

FIGURE 5 shows the dies in the fullly engaged position and the cover member permanently sealed to the receptacle;

FIGURE 8 is a fragmentary sectional view similar to the sectional view of FIGURE 6 of another modified form of circularly shaped container, which is constructed in accordance with and embodies the present invention and shows the sealed joint of two container sections;

FIGURE 9 is a fragmentary vertical sectional view similar to the view of FIGURE 7 and showing the two sections of the container of FIGURE 8 in unassembled form;

FIGURES 10 and 11 are sequential enlarged sectional views showing the method of sealing the cover members of FIGURE 6 or 8 to the receptacles of FIGURE 6 or 8 in accordance with the present invention of which:

FIGURE 10 illustrates the dies which are used to seal the cover member to the receptacle and showing the cover member and receptacle in a separated position;

FIGURE 11 shows the dies in the fully engaged position and the cover member permanently sealed to the receptacle;

FIGURE 12 is a perspective view of a modified form of rectangularly shaped container constructed in accordance with and embodying the present invention;

FIGURE 13 is a fragmentary vertical sectional view taken along the sealed joint of the two container sections of FIGURE 12;

FIGURE 14 is a fragmentary vertical sectional view similar to the view of FIGURE 13 and showing the two sections of the container of FIGURE 12 in unassembled form;

FIGURES 15 and 16 are sequential enlarged sectional views schematically showing the method of sealing the cover member of FIGURE 12 to the receptacles of FIGURE 12 in accordance with the present invention of which:

FIGURE 15 illustrates the dies used to seal the cover member to the container where the cover member and receptacle are in the separated position;

FIGURE 16 shows the dies in the fully engaged position and the cover member permanently sealed to the receptacle;

FIGURE 17 is a fragmentary vertical sectional view similar to the view of FIGURE 13 of a modified form of rectangularly shaped container and taken along the sealed joint of the two container sections;

FIGURE 18 is a fragmentary vertical sectional view similar to the sectional view of FIGURE 14 and showing the two sections of the container of FIGURE 17 in unassembled form;

Figure 19:
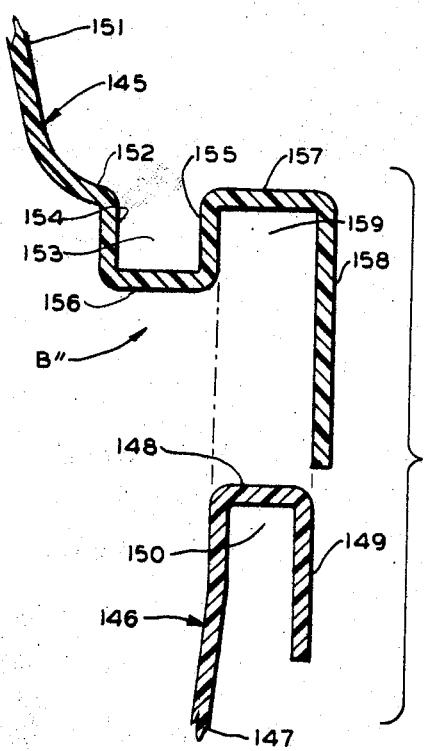
FIGURE 19 is a fragmentary vertical sectional view similar to the view of FIGURE 17 of another modified form of rectangularly shaped container which is constructed in accordance with and embodies the present invention and shows the sealed joint of two container sections.
Figure 21:
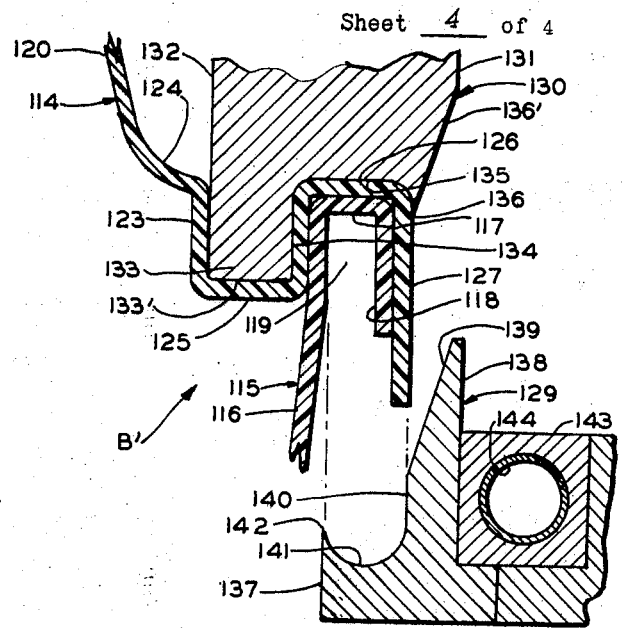
Figure 20:
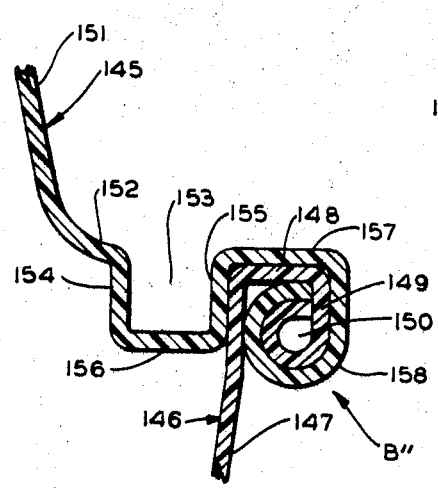
Figure 22:
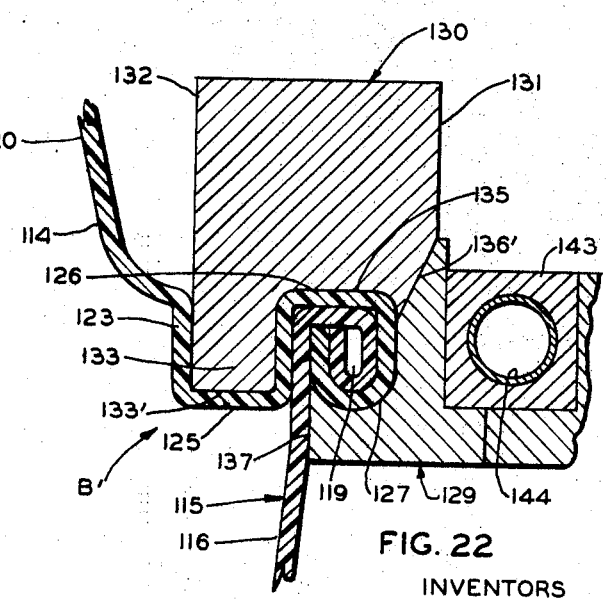

FIGURE 20 is a fragmentary vertical sectional view similar to the view of FIGURE 18 and showing the two sections of the container of FIGURE 19 in unassembled form; and FIGURES 21 and 22 are sequential enlarged sectional views showing the method of sealing the cover member of FIGURES 17 and 19 to the receptacle of FIGURES 17 and 19 in accordance with the present invention of which:

FIGURE 21 illustrates the dies which are used to seal the cover member to the receptacle and showing the cover member and receptacle in a separated position;

FIGURE 22 shows the dies in the fully engaged position and the cover member permanently sealed to the receptacle.

GENERAL DESCRIPTION

Generally speaking, the present invention comprises a container which is formed by sealing a cover member to a receptacle portion. The cover members and receptacle portions of the containers are designed so that they are nestable in similar cover members and receptacle portions respectively. The container of the present invention is illustrated in six embodiments, three of which disclose a container having a circular horizontal cross section and the other three of which discloses a container having a somewhat rectangular horizontal cross section. The container of the present invention includes a cover member and receptacle which are provided with novel interlocking means for retaining the cover member in a closurewise position on the receptacle portion.

The receptacle of the circular container is provided along its upper margin with a reversely bent downwardly extending flange forming an annular groove. The cover member of the circular container is also formed with an annular downwardly flaring flange which is capable of being heated to a flexible condition and bent inwardly into the groove formed on the receptacle. In another embodiment of the circular container, each of the flanges is curled inwardly in the form of a bead. In the third embodiment of the circular container, each of the flanges is curled inwardly in the form of a bead and bent back upon themselves so that they are horizontally disposed. This unique set of flanges and the coaction therebetween forms the novel interlocking means of the container of the present invention. The present invention also provides two sets of dies for sealing the circular cover members to the circular receptacles. One of the set of dies engages the cover member and the receptacle and forms an annular bead, which is spaced from the wall of the receptacle. The second of the set of dies forms an annular bead against the wall of the receptacle.

The present invention also provides a container which is substantially rectangular in horizontal cross section and also includes the cover member and receptacle which are provided with novel interlocking means for retaining the cover member in closurewise position on the receptacle. The receptacle is again provided with a reversely bent U-shaped flange forming a downwardly open annular groove. The cover member is similarly provided with a downwardly flaring flange which is capable of being heated into a flexible condition and urged into the groove formed on the receptacle. A unique reinforcing groove is also formed with the cover member and extends inwardly into the receptacle and engages the upper margins of the side wall of the receptacle when the two are secured in the form of a unitary structure. A modification of the so-called "rectangular" container provides an interlocking mechanism where the flange of the receptacle and the flange of the cover member are both curled inwardly and upwardly in the form of a bead. In a third modification of the so-called rectangular container, the flanges of the cover member and receptacle are both curled inwardly and upwardly in the form of a bead and bent back upon themselves so that they are horizontally disposed. The present invention also provides two sets of dies of sealing the rectangular cover members to the rectangular receptacle. One of the set of dies engages the cover member and the receptacle and forms an annular bead which is spaced from the wall of the receptacle. The second of the set of dies forms an annular bead against the wall of the receptacle.

DETAILED DESCRIPTION

Figure 1:
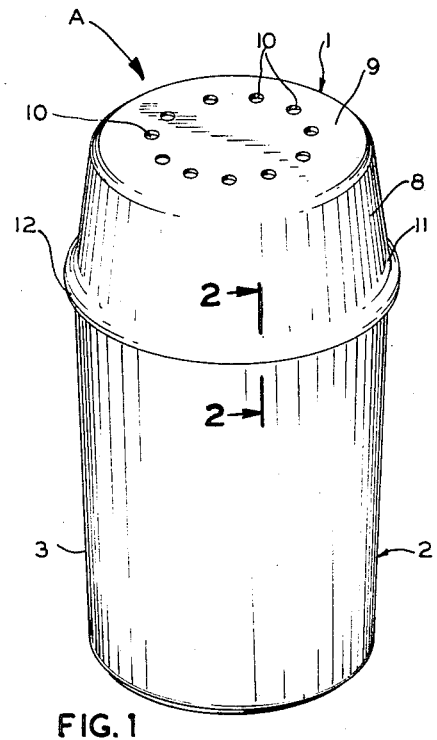
FIGURE 1 is a perspective view of a circularly shaped container constructed in accordance with and embodying the present invention.

Referring now in more detail and by reference characters to the drawings, which illustrate practical embodiments of the present invention, A designates a plastic container which is circular in horizontal cross section and comprises a cover member 1 which is sealed to a receptacle or container portion 2 in the manner as shown in FIGURE 1. The cover member 1 and the container portion or receptacle 2 are formed by any convenient process and apparatus such as by the molding machine described in the R. K. Shelby et al. Patent No. 2,967,328.

The cover member 1 and receptacle 2 are preferably formed of a high impact modified polystyrene. The modified polystyrene material generally comprises approximately 94% polystyrene and approximately 5.0 to 6.0% of a styrene-butadiene rubber. Additionally, the composition of the present invention also contains approximately 2.0% of a mineral oil such as standard aliphatic white mineral oil such as the oil sold under the trademark Westol 35 from Penn Refining Company. The mineral oil employed in the composition is preferably designed to have a Saybolt viscosity within the range of 80 to 210 at a temperature of 70° F. While the styrene-butadiene rubber can be varied between 4.0% and 10.0%, the mineral oil can be varied between 0.5% and 3.0% with the polystyrene making up the remainder of the mixture.

Figure 3:
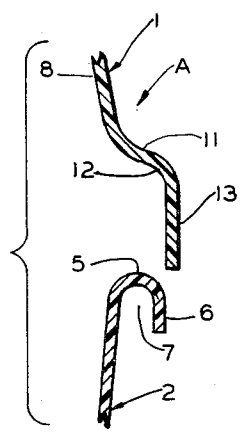
FIGURE 3 is a fragmentary vertical sectional view similar to the view of FIGURE 2 and showing the two sections of the container of FIGURE 1 in unassembled form.

The receptacle 2 which is generally cylindrical in horizontal cross section includes an annular skirt-forming wall 3 and a relatively flat bottom wall 4. The receptacle 2 is integrally provided along its upper margin with an annular outwardly struck lip 5 which merges into an annularly formed downwardly struck rim-forming flange 6, substantially as shown in FIGURE 3. The downwardly struck flange 6 is spaced from the skirt-forming wall 3 and thereby forms an annular groove 7. The flange 6 is spaced from the skirt-forming wall 3 by a distance which is approximately equal to twice the thickness of the flange 6 and moreover, the flange 6 is substantially parallel to the skirt-forming wall 3. Thus, it can be seen that as the skirt-forming wall 3 has a downwardly converging taper, the flange 6 also projects downwardly in parallel relationship thereto.

Figure 2:
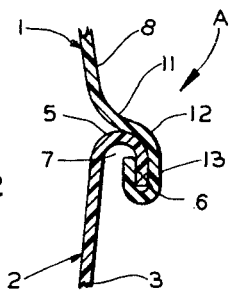
FIGURE 2 is a fragmentary vertical sectional view taken along the sealed joint of the two container sections of FIGURE 1.

The cover member 1 which is also cylindrical in horizontal cross section includes an annular skirt 8, which integrally merges along its upper margin into a relatively flat top wall 9. By reference to FIGURES 1 and 3, it can be seen that the top wall 9 is preferably provided with dispensing apertures or any suitable type of removable lid or conventional cover element 10 for dispensing the contents of the container A. The skirt 8 is provided along its lower margin with a annular outwardly struck lip 11, the latter forming an annular shoulder surface 12 on its underside and which is supported on the upper surface of the lip 5 when the cover member 1 is sealed to the receptacle substantially as in the manner as shown in FIGURE 2. The lip 11 is integrally formed with a downwardly struck rim forming flange 13 which is slightly longer than the flange 6. The flange 13 is sized to snugly engage the exterior surface of the flange 6 in frictional contact when the cover member 1 is disposed upon the receptacle 2 in the manner as shown in FIGURE 2. The flange 13 is of sufficient length to have a relatively free terminal portion which is capable of being heated to a temperature where it becomes flexible and is upwardly struck into the groove 7. In the sealing operation to be hereinafter described, the terminal portion of the flange 13 is sealed in the annular groove 7 to form a perfect liquid-tight seal between the cover member 1 and the receptacle 2.

Figure 4:
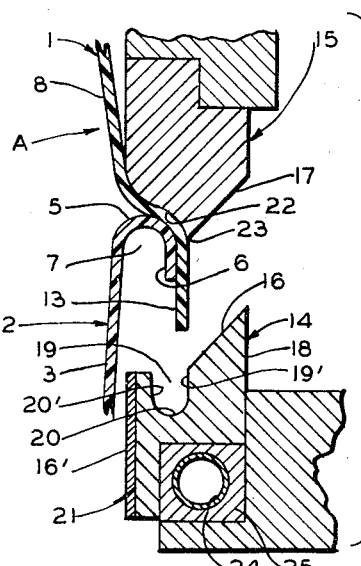
Figure 5:
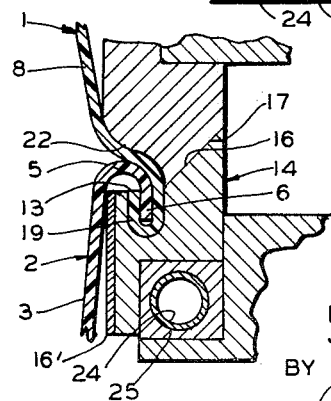

The cooperating dies which are employed to seal the cover member 1 to the receptacle 2 are more fully illustrated in FIGURES 4 and 5, where FIGURE 4 shows the dies in the separated position and FIGURE 5 shows the dies in the fully engaged position. These dies may be mounted on a suitable worktable for manual operation, or they may be preferably mounted on an automatically operable device of the type described in my copending application Ser. No. 508,412, filed Oct. 18, 1965.

This apparatus generally comprises a circular rotating table which is provided with a series of receptacle accommodating apertures. Disposed above the table in proximate radial alignment with each of the apertures is a circular housing containing nested receptacles and which is adapted to deposit a receptacle in each aperture, as the aperture passes beneath the receptacle housing. This receptacle housing constitutes a first station. At a second station, a cover member housing is provided and contains a stack of nested cover members. This housing is similarly provided with means for depositing a cover member on a receptacle as the receptacle passes therebeneath. This cover member housing constitutes a second station. As the receptacle, which is disposed with an aperture, passes between the first and second stations, it is suitably filled with any suitable material that it is designed to contain.

The receptacle with the cover member disposed thereon is next passed to a third station where a male die engages the cover member and forces the same into intimate contact with the receptacle. Simultaneously therewith, the receptacle is lowered so that the cover member and receptacle are maintained in contact with a heated female die for sealing the cover member to the receptacle. This contact with the heated female die is maintained for a predetermined period until the material in contact therewith becomes sufficiently flexible; at which time the male die subjects the cover member to an instantaneous downwardly directed force where the cover member is sealed to the receptacle. Thereafter, the sealed container is ejectd from the aperture and deposited upon a suitable conveyor mechanism at a fourth station. A suitable driving mechanism is provided for operating each of the aforementioned functions in pretimed relationship.

The cooperating dies illustrated in FIGURES 4 and 5 generally comprise a female die 14 which cooperates with a male die 15. The dies 14, 15 operate by means of the above-described apparatus to force the cover member into intimate contact with the upper margin of the receptacle 2 and furthermore, urge the receptacle 2 and cover member 1 disposed thereon into intimate contact with the female die 14. The female die 14 is defined by a substantially frusto-conically shaped interior side wall 16 which matches a similar wall 17 on the male die 15 and is formed in an enlarged upper end portion 18. An annular heat insulating member 16' is secured to the wall 16 and protects the wall 3 of the receptacle 2. The side wall 16 merges into a generally upward opening U-shaped groove 19 with a downwardly sloping intermediate wall 19'. The intermediate wall 19' merges into a lower arcuate surface 20 which is concave upwardly in shape and integrally merges into an upwardly extending relatively flat side wall 20′. The die 14 is formed with a flat interior annular side wall 21 which is spaced inwardly from the groove 19 and engages the exterior wall of the receptacle 2. The male die 15 is substantially circular in horizontal cross section and has a rounded lower edge 22 which integrally merges along its outer periphery to a downwardly extending relatively sharp guide flange 23.

Figure 6:
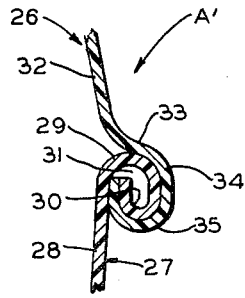
FIGURE 6 is a fragmentary vertical sectional view similar to the view of FIGURE 2 of a modified form of circularly shaped container which is constructed in accordance with and embodies the present invention and shows the sealed joint of two container sections.
Figure 7:
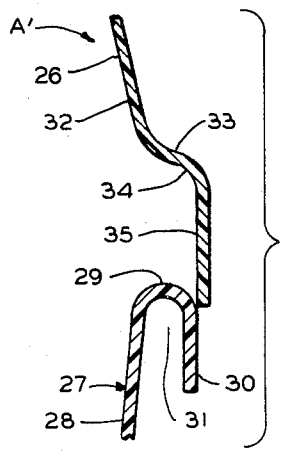
FIGURE 7 is a fragmentary vertical sectional view similar to the view of FIGURE 3 and showing the two sections of the container of FIGURE 6 in unassembled form.

A heating element 24 is embedded in a retaining ring 25 and surrounds the female die 14 in the manner as illustrated in FIGURES 6 and 7 for providing heat to the female die 14. The heating element 24 is connected through a suitable conductor such as, for example brushes and commutators (not shown), to a suitable source of electrical power (also not shown). The heating element 24 is of such capacity and is so disposed along the outer margin of the female die 14 that it is effective to maintain the female die 14 at a temperature to heat the free edge portion of the flange 13 to a desired temperature effective to render the free edge portions readily deformable.

The male die 15 is urged into contact with the upper surface of the cover member 1 and the arcuate surface 20 of the die engages the shoulder 12 of the cover member 1, in the manner as in FIGURE 4. The female die is substantially circular and provided with a hollow portion so that it accommodates the receptacle 2 in the manner as illustrated in FIGURE 4. When the two dies 14, 15 are urged together in a "sealing position," that is the position as illustrated in FIGURE 5, the flange 13 will become disposed over the lie in facewise engagement with the flange 6. The heating element 24 will create sufficient heat to bring the two flanges 6 and 13 to the desired post-forming temperature. It has been found in connection with the present invention that the material in the flanges 6, 13 should be heated to approximately 210 to 240° F. for the post-forming operation. At this temperature range, the plastic material is sufficiently above the low-softening range and furthermore, sufficiently below the orientation temperature of 225 to 260° F. for the particular type of material employed. It has been found that within this temperature range of 210 to 240° F. approximately 6–10 seconds of preheating are desirable before the post-forming operation. During the post-forming operation, the flange 13 is forced into the groove 7 in the manner as illustrated in FIGURE 5. In effect, the free edge portion of the flange 13, which has been softened is urged into the groove 7 so that it is in a substantially upwardly struck vertical position. Furthermore, the free edge portion of the flange 13 is spaced from the exterior wall of the receptacle 2 by a distance which is approximately equal to the thickness of the flange 13 and also frictionally engages the interior wall of the flange 13. It should be pointed out that the post-forming operation takes place in the manner of a fraction of a second so that the reorientation of the plastic material does not take place. The two dies are moved toward each other in the post-forming operation at a rate of speed which prevents overheating and possible shrinking and undesired curling of the flange. It should be recognized that a fluid-tight mechanical seal is thereby attained. The heat and pressure of forcing the two dies together provides sufficient energy to cause the free terminal margin of the flange 13 to becomee readily deformable. The flange is thereby mechanically urged into the groove 7. However, a permanent heat seal where fusion of the flanges 13 and 6 does not take place since the plastic material is always maintained below its reorientation temperature.

It is possible to provide a modified form of circularly shaped container A′ substantially as illustrated in FIGURES 6 and 7 and which is substantially similar to the previously described container A. The container A′ is also circular in horizontal cross section and comprises a cover member 26 which is sealed to a receptacle or container portion 27 in the manner as shown in FIGURE 2. The container A′ is preferably formed in the same manner as the container A and moreover, is constructed of the same material as the container A.

The receptacle 27 which is generally cylindrical in horizontal cross section includes an annular skirt forming wall 28. The receptacle 27 is integrally provided along its upper margin with an annular outwardly struck lip 29, which merges into an annularly formed downwardly struck rim forming flange 30 substantially as shown in FIGURE 7. The downwardly struck flange 30 is spaced from the skirt-forming wall 28 by a distance which is approximately equal to the thickness of the flange 30 and thereby forms a downwardly opening annular groove 31. Furthermore, the flange 30 is substantially parallel to the skirt-forming wall 28. Thus, it can be seen that as the skirt-forming wall 28 has a downwardly converging taper, the flange 30 also projects downwardly in parallel relationship thereto. It is to be noted that the flange 30 is slightly longer with respect to the overall vertical dimension of the receptacle 27 than the flange 6 was with respect to the overall vertical dimension of the receptacle 22.

The cover member 26 which is also cylindrical in horizontal cross section includes an annular skirt 32. The skirt 32 is provided along its lower margin with an annular outwardly struck lip 33, the later forming an annular shoulder surface 34 on its underside and which is supported on the upper surface of the lip 29 when the cover member 26 is sealed to the receptacle 27 substantially in the manner as shown in FIGURE 6. The lip 33 is integrally formed with a downwardly struck rim forming flange 35 which is slightly longer than the flange 30. The flange 35 is sized to snugly engage the exterior surface of the flange 30 in frictional contact when the cover member 26 is disposed upon the receptacle 27 in the manner as shown in FIGURE 6. The flanges 30, 35 are of sufficient length to have relatively free terminal portions which are capable of being heated to a temperature where they become flexible and are upwardly struck into the grove 31. In the sealing operation to be hereinafter described, the terminal portions of the flanges 30, 35 are sealed in the annular groove 31 to form a perfect liquid-tight seal between the cover member 26 and the receptacle 27.

The cover member 26 is sealed to the receptacle 27 in a manner which is substantially similar to the method employed in sealing the cover member 1 to the receptacle 2. The cooperating dies which are employed to seal the cover member 26 to the receptacle 27 are more fully illustrated in FIGURES 10 and 11, where FIGURE 10 shows the dies in the separated position and FIGURE 11 shows the dies in the fully engaged position. These dies also may be mounted on a suitable worktable for manual operation, or they may be preferably mounted on the automatically operable device of the type described in my copending application Ser. No. 508,412, filed Oct. 18, 1965.

The cooperating dies illustrated in FIGURES 10 and 11 generally comprise a female die 36 which cooperates with a male die 37. The dies 36, 37 can be manually urged together or can operate by means of the above-described apparatus to force the cover member 26 into intimate contact with the upper margin of the receptacle 27 and furthermore, urge the receptacle 27 and cover member 26 disposed thereon into intimate contact with the female die 36. The female die 36 is defined by a substantially frusto-conically shaped interior side wall 38 having an enlarged substantially cylindrical upper end portion 39. The end portion 39 has an arcuate top wall 40 which merges into a generally downwardly and inwardly sloping intermediate portion 41 and extending between the intermediate portion 41 and the frusto-conically shaped side wall 38 is a lower arcuate surface 42 which is concave upwardly in shape and integrally merges into an upwardly extending relatively sharp edge 42′ at the point of connection with the side wall 38. The male die 37 is substantially circular in horizontal cross-section and has a rounded lower edge 43 which integrally merges along its outer periphery into a downwardly extending relatively sharp guide flange 44.

A heating element 45 is embedded in a retaining ring 46 and surrounds the female die 36 in the manner as illustrated in FIGURES 10 and 11 for providing heat to the female die 36. The heating element 36 is connected through a suitable conductor such as, for example brushes and commutators (not shown), to a suitable source of electrical power (also not shown). The heating element 45 is of such capacity and is so disposed along the outer margin of the female die 36 that it is effective to maintain the female die 36 at a temperature to heat the free edge portions of the flanges 30, 35 to a desired temperature effective to render the free edge portions readily deformable. However, it should be recognized that the lower arcuate surface 42 has a slightly larger width or radial dimension than the arcuate wall used for sealing when sealing the cover member 1 to the receptacle 2. It should also be recognized that the flange 35 is longer than the flange 13 in the cover member. Thus, by employment of a slightly longer flange 35 and a slightly wider arcuate wall 20 in the female die 14, it is possible to curl both of the flanges 35, 30 to form an annular bead, which is also substantially annular in cross section.

The male die 37 is urged into contact with the upper surface of the cover member 26 and the arcuate surface of the die 37 engages the lip 33 of the cover member 26 in the manner as in FIGURE 10. The female die is substantially circular and provided with a hollow portion so that it accommodates the receptacle 27 in the manner as illustrated in FIGURE 10. When the two dies 36, 37 are urged together in a "sealing position," that is the position as illustrated in FIGURE 11, the flange 35 will become disposed over and lie in facewise engagement with the flange 30. The heating element 45 will create sufficient heat to bring the two flanges 30 and 35 to the desired post-forming temperature. It has been found in connection with the present invention that the material in the flanges 30, 35 should be heated to approximately 210 to 240° F. for the post-forming operation. At this temperature range, the plastic material is sufficiently above the low-softening range and furthermore, sufficiently below the orientation temperature of 225 to 260° F. for the particular type of material employed. It has been found that within this temperature range of 210 to 240° F. approximately 6–10 seconds of preheating are desirable before the post-forming operation. During the post-forming operation, the flanges 30, 35 are both bent inwardly and forced into the downwardly opening groove 31 in the manner as illustrated in FIGURE 11. In effect, the free edge portion of the flanges 30, 35 which have been softened are urged into the groove 31 so that they are in a substantially upwardly struck vertical position. The two free edge portions of the flanges 30, 35 are spaced from the interior wall of the flange 30 and furthermore, the free edge portion of the flange 35 engages the exterior surfaces of the receptacle 27. It should be pointed out that the post-forming operation takes place in the matter of a fraction of a second so that the reorientation of the plastic material does not take place. The two dies are moved toward each other in the post-forming operation at a rate of speed which prevents over-heating and possible shrinking and undesired curling of either of the flanges 30, 35.

Again, it should be recognized that the two flanges 30, 35 are not fused through a heat sealing operation. It is the pressure applied to the cover member in combination with the heat causing both of the flanges to become readily deformable which causes each of the flanges to curl in the form of this annular bead. However, it should be recognized that the bead nevertheless provides a fluid-tight seal between the cover member 26 and the receptacle 27. It is to be noted by reference to FIGURE 10 that both of the flanges 30, 35 are concentrically turned inwardly and curled and this curl forms a mechanical airtight connection between each of the sections. The bead between the two sections is substantially annular in transverse cross section and thereby affords a smooth substantially round free edge having the advantage of affording an especially pleasing finished appearance and which is comfortable when grasped by a user's fingers.

It is possible to provide a modified form of circularly shaped container A″ substantially as illustrated in FIGURES 8 and 9 and which is substantially similar to the previously described containers A and A′. The container A″ is also circular in horizontal cross section and comprises a cover member 47 which is sealed to a receptacle or container portion 48 in the manner as shown in FIGURE 9. The container A″ is preferably formed in the same manner as the container A or A′ and moreover, is constructed of the same material as the container A or A′.

The receptacle 48 which is generally cylindrical in horizontal cross section includes an annular skirt forming wall 49. The receptacle 48 is integrally provided along its upper margin with an annular outwardly struck lip 50, which merges into an annularly formed downwardly struck rim forming flange 51 substantially as shown in FIGURE 8. The downwardly struck flange 51 is spaced from the skirt-forming wall 49 by a distance which is slightly greater than twice the thickness of the flange 51 and thereby forms a downwardly opening annular groove 52. Furthermore, the flange 51 is substantially parallel to the skirt-forming wall 49. Thus, it can be seen that as the skirt-forming wall 49 has a downwardly converging taper, the flange 51 also projects downwardly in parallel relationship thereto. It is to be noted that the flange is slightly longer with respect to the overall vertical dimension of the receptacle 48 than the flange 6 was with respect to the overall vertical dimension of the receptacle 2. The flange 51 is also longer than the similar flange 35 in the container A′.

The cover member 47 which is also cylindrical in horizontal cross section includes an annular skirt 53. The skirt 53 is provided along its lower margin with an annular outwardly struck lip 54, the latter forming an annular shoulder surface 55 on its underside and which is supported on the upper surface of the lip 50 when the cover member 47 is sealed to the receptacle 48 substantially in the manner as shown in FIGURE 9. The lip 54 is integrally formed with a downwardly struck rim forming flange 56, which is slightly longer than the flange 51. In this connection, it should also be noted that the flange 56 is longer than the flange 30 of the container A′. The flange 5 is sized to snugly engage the exterior surface of the flange 51 in frictional contact when the cover member 47 is disposed upon the receptacle 48 in the manner as shown in FIGURE 8. The flanges 51, 56 are of sufficient length to have relatively free terminal portions which are capable of being heated to a temperature where they become flexible and are upwardly struck into the groove 52. In the sealing operation to be hereinafter described, the terminal portions of the flanges 51, 56 are sealed in the annular groove 52 to form a perfect liquid-tight seal between the cover member 47 and the receptacle 48.

The cover member 47 is sealed to the receptacle 48 in a manner which is similar to the method employed in sealing the cover member 26 to the receptacle 27. The same female and male dies 36 and 37, respectively are also employed. As indicated above, the flanges 51, 56 in the container A″ are longer than the same flanges in the container A′. When the two dies 36, 37 are forced together, the flanges 51, 56 are urged upwardly into the groove 52. In the case of the container A′, the flanges were substantially vertically disposed so that in effect, the flanges were U-shaped after the sealing operation. In the case of the container A″, the flanges 51, 56 being substantially longer, are bent over so that they are substantially horizontally disposed. In effect, the free terminal portions of the flanges 51, 56 are rotated approximately 270° and the free ends thereof point toward the vertical portions of the flanges 51, 56.

Again, it should be recognized that the two flanges 30, 35 are not fused through a heat sealing operation. It is the pressure applied to the cover member in combination with the heat causing both of the flanges to become readily deformable which causes each of the flanges to curl in the form of this annular bead. However, it should be recognized that the bead nevertheless provide a fluid-tight seal between the cover member 47 and the receptacle 48. It is to be noted by reference to FIGURE 8 that both of the flanges 51, 56 are concentrically turned inwardly and curled and this curl forms a mechanical airtight connection between each of the sections. The bead between the two sections is substantially annular in transverse cross section and thereby affords a smooth substantilly round free edge having the advantage of affording an especially pleasing finished appearance and which is comfortable when grasped by a user's fingers.

It is possible to provide a modified form of container B substantially as shown in FIGURES 12–14 which is non-circular and preferably rectangular in horizontal cross section. The container B is similarly formed with a nestable cover member 80 sealed to a nestable receptacle 81, the sections of which are formed by any suitable molding process such as the type described in the R. K. Shelby et al. Patent No. 2,967,328. The container B is also preferably formed of the same material as either of the containers A, A' or A''.

The receptacle 81, which is generally rectangular in horizontal cross section includes four upwardly and outwardly diverging side walls 82 which are connected along their lower margins by a relatively flat bottom wall 83. In this connection, it should be understood that the container B of the present invention is not limited to receptacles having non-uniform cross sectional areas and that each of the side walls 82 could be relatively vertical, thereby forming containers having uniformly sized cross sectional areas along their entire length. Each of the side walls 82 is provided along its upper margin with annular outwardly extending horizontal lips 84 which integrally merge into downwardly extending rim-forming flanges 85. The flanges 85 extend in a direction which is parallel to each of the matching walls 82 and are spaced from the walls 82 by a distance which is approximately equal to twice the thickness or slightly greater than twice the thickness of the flanges 85 thereby forming an annular groove 86.

The cover member 80, which is similarly rectangular in horizontal cross section is formed with four upwardly and inwardly converging side walls 87, which are connected along their upper margins by a relatively flat top wall 88. By reference to FIGURE 12, it can be seen that the top wall 88 is similarly provided with dispensing apertures or suitable dispensing and closure means 89. The four side walls 87 integrally merge into outwardly extending relatively flat side wall portions 90, which are located at a greater dihedral angle than the side walls 87 and integrally merge into upwardly opening U-shaped reinforcing channels 91. The reinforcing channels 91 consist of a downwardly extending wall 92, which integrally merges into the lower end of the side wall portions 90 and a contact wall 93, which is spaced from the wall 92 and connected by a bight portion 94. The contact wall 93 integrally merges into an outwardly extending annular lip 95 which in turn, integrally merges into a downwardly extending rim-forming flange 96, thereby forming a downwardly opening U-shaped channel 97.

By further reference to FIGURE 14, it can be seen that the distance between the exterior surface of the wall 93 and the interior surface of the flange 96 is substantially equal to the width of the U-shaped groove 86 and the combined thickness of the wall 82 and the flange 85 so that when the cover member 80 is disposed upon the receptacle 81, the undersurface of the lip 95 bears against the upper surface of the horizontal lip 84, the flange 96 engages the outer surface of the flange 85 and the U-shaped reinforcing channel 91 fits snugly within the upper open end of the receptacle 81, where the exterior surface of the engaging wall 93 snugly engages the interior surface of the wall 82 along its upper margin. The flange 85 is spaced from the side wall 82 by a distance which is approximately equal to approximately twice the thickness of the flange 96, and the length of the flange 96 is sufficient so that it can be heated and tucked into the area formed by the groove 86 and permanently sealed therein.

The cover member 80 is sealed to the receptacle 81 by use of male and female dies 98, 99 respectively as illustrated in FIGURES 15 and 16. The dies 98, 99 again, may be manually operated by any suitable mechanism, or may be secured to and operable by an automatic sealing apparatus of the type described in my copending application Ser. No. 508,412, filed Oct. 18, 1965.

The male die 98 is substantially rectangular in horizontal cross section and includes relatively vertical exterior and interior walls 100, 101 respectively. The interior wall 101 integrally merges into a rectangularly shaped downwardly extending projection 102 having a bottom face 102' and an outwardly presented flat face 103. The flat face 103, in turn, merges into a downwardly facing upper wall 104 and which is connected through a relatively sharp marginal edge 105 to an outwardly and upwardly inclined outer wall 105'.

The female die 99 includes four downwardly converging side walls 106 which engage the side walls 82 of the receptacle 81. A rectangular heat insulating member 106' is secured to the walls 106 and protects the side walls 82 of the receptacle 81. The side walls 106 integrally merge into an upper end portion 107 having a U-shaped grove 107', which is in turn formed by a downwardly inclined upper guide surface 108, the latter integrally merging into a downwardly extending intermediate portion 109. By further reference to FIGURES 15 and 16, it can be seen that the intermediate portion 109 merges into an arcuate lower surface 110 which is concave upwardly in shape. The U-shaped groove 107' is spaced from the walls 106 by a lateral wall 111 substantially as shown in FIGURE 15. Surrounding the female die 99 is an aluminum casting 112 which carries an electrically operated heating element 113 and which is substantially identical to the previously described heating element 24.

The male die 98 is urged into contact with the upper surface of the cover member 80 in the manner as illustrated in FIGURE 15. After the cover member 80 has been positioned on the receptacle in the manner as illustrated in FIGURE 15, the two dies 98, 99 are shifted towards each other, thereby permitting intimate contact between the flange 96 on the cover member 80 and the flange 85 on the receptacle 81. Furthermore, the flanges 96, 85 are brought into intimate contact with the heated female die 99. The flange 96 will then engage the upper guide surface 108 and is guided into contact with the intermediate portion 109. The terminal margin of the flange 96 is heated to a temperature where it is readily deformable as shown in FIGURE 16, and continued downward pressure on the cover member 80 will cause the readily deformable free margin of the flange 96 to curl along the lower surface 110 until it is forced into the groove 86. The heating element 113 will create sufficient heat to bring the flanges 96, 85 to the desired post-forming temperature. Again, it has been found in connection with the present invention that the material in the flanges 96, 85 should be heated to approximately 210 to 240° F. for the post-forming operation. This temperature is sufficiently below orientation temperature of 225 to 260° F. for the particular type of material employed. In effect, the free edge portion of the flange 96 which has been softened is urged into the groove 86 so that it is held in a substantially upwardly struck vertical position. Furthermore, the free edge portion of the flange 96 is spaced from the exterior wall of the receptacle 81 by a distance which is approximately equal to the thickness of the flange 96 and also frictionally engages the interior wall of the flange 85. Again, the post-forming operation takes place in a matter of a fraction of a second so that the reorientation of the plastic material does not take place. The two dies are moved toward each other in the post-forming operation at a rate of speed which prevents overheating and possible shrinking and undesired curling of the flange. Consequently, a fluid-tight mechanical seal is thereby attained.

It can be seen, by reference to FIGURE 15, that the projection 102 will engage the upwardly opening U-shaped reinforcing channel 91 and thereby prevent collapsing of the side walls 87 forming part of the cover member 80. The horizontal lips 84 are sized so that they fit snugly within the downwardly U-shaped channel 97 in which manner the surface of the contact wall 93 engages the interior surface of the walls 82 along their upper margin. In this manner, both the cover member 80 and the receptacle 81 are prevented from collapsing when pressure from the male die 98 is applied to the cover member 80.

It is possible to provide a modified form of container B′ substantially as shown in FIGURES 17 and 18, which is non-circular and preferably rectangular in horizontal cross section. The container B′ is substantially similar to the container B and is similarly formed of a nestable cover member 114 which is sealed to a nestable receptacle 115. The container B′ is again preferably formed of the same material as any of the containers A, A′, A″, or B. The receptacle 115, which is generally rectangular in horizontal cross section includes four upwardly and outwardly diverging side walls 116. In this connection, it should be understood that the container B′ of the present invention is also not limited to receptacles having non-uniform cross sectional areas and that each of the side walls 116 could be relatively vertical, thereby forming containers having uniformly sized cross sectional areas along their entire length. Each of the side walls 116 is provided along its upper margin with annular outwardly extending horizontal lips 117 which integrally merge into downwardly extending rim-forming flanges 118. The flanges 118 extend in a direction which is parallel to each of the matching side walls 116 and are spaced from the walls 116 by a distance which is slightly greater than twice the thickness of the flanges 118, thereby forming an annular groove 119.

The cover member 114 which is similarly rectangular in horizontal cross section is formed with four upwardly and inwardly converging side walls 120 which are connected along their upper margins by a relatively flat top wall similar to the top wall 88 in the container B. The top wall may also be provided with dispensing apertures or suitable dispensing and closure means (not shown). The four side walls 120 integrally merge into outwardly extending relatively flat side wall portions 121 which are located at a greater dihedral angle than the side walls 120 and integrally merge into upwardly opening U-shaped reinforcing channels 122. The reinforcing channels 122 consist of a downwardly extending wall 123 which integrally merges into the lower end of the side wall portions 121 and a contact wall 124 which is spaced from the wall 123 and connected by a bight portion 125. The contact wall 124 integrally merges into an outwardly extending annular lip 126 which, in turn, integrally merges into a downwardly extending rim-forming flange 127, thereby forming a downwardly opening U-shaped channel 128.

By further reference to FIGURE 17, it can be seen that the distance between the exterior surface of the wall 124 and the interior surface of the flange 127 is substantially equal to the width of the U-shaped groove 119 and the combined thickness of the wall 116 and the flange 118. When the cover member 114 is disposed upon the receptacle 115, the undersurface of the lip 126 bears against the upper surface of the horizontal lip 117 and the flange 127 engages the outer surface of the flange 118. The U-shaped reinforcing channel 122 fits snugly within the upper open end of the receptacle 115, where the exterior surface of the engaging wall 124 snugly engages the interior surface of the wall 116 along its upper margin. The flange 118 is spaced from the side wall 116 by a distance which is slightly greater than twice the thickness of the flange 118.

The cover member 114 is sealed to the receptacle 115 in a manner which is substantially similar to the method employed in sealing the cover member 80 to the receptacle 81. The cooperating dies which are employed to seal the cover member 26 to the receptacle 27 are more fully illustrated in FIGURES 21 and 22, where FIGURE 21 shows the dies in the separated position and FIGURE 22 shows the dies in the fully engaged position. These dies also may be mounted on a suitable work table for manual operation, or they may be preferably mounted on the automatically operable device of the type described in my copending application Ser. No. 508,412, filed Oct. 18, 1965.

The cooperating dies illustrated in FIGURES 21 and 22 generally comprise a female die 129 which cooperates with a male die 130. The dies 129, 130 can be manually urged together or can operate by means of the above-described apparatus to force the cover member 114 into intimate contact with the upper margin of the receptacle 115 and furthermore, urge the receptacle and cover member 114 disposed thereon into intimate contact with the female die 129.

The male die 130 is substantially rectangular in horizontal cross section and includes four relatively vertical exterior and interior walls 131, 132 respectively. The interior wall 132 integrally merges into a rectangularly shaped downwardly extending projection 133 having a bottom face 133′ and an outwardly presented flat face 134. The flat face 134, in turn, merges into a downwardly facing upper wall 135 and which is connected through a relatively sharp marginal edge 136 to an outwardly and upwardly inclined outer wall 136′.

The female die 129 includes four downwardly converging side walls 137 which engage the side walls 116 of the receptacle 115. The side walls 137 integrally merge into an upper end portion 138 which is formed by a downwardly inclined upper guide surface 139, the latter integraly merging into a downwardly extending intermediate portion 140. By further reference to FIGURES 21 and 22, it can be seen that the intermediate portion 140 merges into an arcuate lower surface 141 which is concave upwardly in shape. The surface 141 integrally merges into an upwardly extending relatively sharp marginal edge 142, substantially as shown in FIGURE 21. Surrounding the female die 129 is an aluminum casting 143 which carries an electrically operated heating element 144 and which is substantially identical to the previously described heating element 24.

The male die 130 is urged into contact with the upper surface of the cover member 114 in the manner as illustrated in FIGURE 21. After the cover member 114 has been positioned on the receptacle 115 in the manner as illustrated in FIGURE 22, the two dies 129, 130 are shifted towards each other, thereby permitting intimate contact between the flange 127 on the cover member 114 and the flange 118 on the receptacle 115. Furthermore, the flanges 118, 127 are brought into intimate contact with the heated female die 129. The flanges 127, 118 will engage the upper guide surface 139 and are guided into contact with the intermediate portion 140. The terminal margins of the flanges 127, 118 are heated to a temperature where they are readily deformable as shown in FIGURE 21, and continued downward pressure on the cover member 114 will cause the readily deformable free margins of the flanges 118, 127 to curl along the lower surface 141 until they are forced into the groove 119. The heating element 144 will create sufficient heat to bring the flanges 118, 127 to the desired post-forming temperature. Again, it has been found in connection with the present invention that the material in the flanges 118, 127 should be heated to approximately 210 to 240° F. for the post-forming operation. This temperature is sufficiently below orientation temperature of 225 to 260° F. for the particular type of material employed. In effect, the free edge portions of the flanges 118, 127 which have been softened are urged into the groove 119 so that they are held in a substantially upwardly struck vertical position. The two free edge portions of the flanges 118, 127 are spaced from the interior wall of the flange 118 and furthermore, the free edge portion of the flange 127 engages the exterior surfaces of the receptacle 115. Again, the post-forming operation takes place in a matter of a fraction of a second so that the reorientation of the plastic material does not take place. The two dies are moved toward each other in the post-forming operation at a rate of speed which prevents overheating and possible shrinking and undesired curling of the flanges. Consequently, a fluid-tight mechanical seal is thereby attained.

It can be seen, by reference to FIGURE 21 that the projection 133 will engage the upwardly opening U-shaped reinforcing channel 122 and thereby prevent collapsing of the side walls 120 forming part of the cover member 114. The horizontal lips 117 are sized so that they fit snugly within the downwardly U-shaped channel 122 in which manner the surface of the contact wall 124 engages the interior surface of the walls 116 along their upper margin. In this manner, both the cover member 114 and the receptacle 115 are prevented from collapsing when pressure from the male die 130 is applied to the cover member 114.

Again, it should be recognized that the two flanges 118, 127 are not fused through a heat sealing operation. It is the pressure applied to the cover member in combination with the heat causing both of the flanges to become readily deformable which causes each of the flanges to curl in the form of this annular bead. However, it should be recognized that the bead nevertheless provides fluid-tight seal between the cover member 114 and the receptacle 115. It is to be noted by reference to FIGURE 22 that both of the flanges 118, 127 are concentrically turned inwardly and curled and this curl forms a mechanical air-tight connection between each of the sections. The bead between the two sections is substantially annular in transverse cross section and thereby affords a smooth substantially round free edge having the advantage of affording an especially pleasing finished appearance and which is comfortable when grasped by a user's fingers.

It is possible to provide another modified form of container B″ substantially as shown in FIGURES 19 and 20, which is non-circular and preferably rectangular in horizontal cross section. The container B″ is substantially similar to the container B and B′ and is similarly formed of a nestable cover member 145 which is sealed to a nestable receptacle 146. The container B″ is again preferably formed of the same material as any of the containers A, A′, A″, B or B′. The receptacle 146 which is generally rectangular in horizontal cross section includes four upwardly and outwardly diverging side walls 147. In this connection, it should be understood that the container B″ of the present invention is also not limited to receptacles having non-uniform cross sectional areas and that each of the side walls 147 could be relatively vertical, thereby forming containers having uniformly sized cross sectional areas along their entire length. Each of the side walls 147 is provided along its upper margin with annular outwardly extending horizontal lips 148 which integrally merge into downwardly extending rim-forming flanges 149. The flanges 149 extend in a direction which is parallel to each of the matching side walls 147 and are spaced from the walls 147 by a distance which is slightly greater than twice the thickness of the flanges 149, thereby forming an annular groove 150.

The cover member 145, which is similarly rectangular in horizontal cross section is formed with four upwardly and inwardly converging side walls 151, which are connected along their upper margins by a relatively flap top wall similar to the top wall 88 in the container B. The top wall may also be provided with dispensing apertures or suitable dispensing and closure means (not shown). The four side walls 151 integrally merge into outwardly extending relatively flat side wall portions 152 which are located at a greater dihedral angle than the side walls 151 and integrally merge into upwardly opening U-shaped reinforcing channels 153. The reinforcing channels 153 consist of a downwardly extending wall 154 which integrally merges into the lower end of the side wall portions 152 and a contact wall 155 which is spaced from the wall 154 and connected by a bight portion 156. The contact wall 155 integrally merges into an outwardly extending annular lip 157 which, in turn, integrally merges into a downwardly extending rim-forming flange 158, thereby forming a downwardly opening U-shaped channel 159.

By further reference to FIGURE 19, it can be seen that the distance between the exterior surface of the wall 155 and the interior surface of the flange 158 is substantially equal to the width of the U-shaped groove 150 and the combined thickness of the wall 147 and the flange 149. When the cover member 145 is disposed upon the receptacle 146, the undersurface of the lip 157 bears against the upper surface of the horizontal lip 148, the flange 149 engages the outer surface of the flange 158 and the U-shaped reinforcing channel 153 fits snugly within the upper open end of the receptacle 146, where the exterior surface of the contact wall 155 snugly engages the interior surface of the wall 147 along its upper margin. The flange 149 is spaced from the side wall 147 by a distance which is slightly greater than twice the thickness of the flange 149. It should be recognized that the flanges 149, 158 of the container B″ are longer than the respective flanges 118, 127 in the container B′.

The cover member 145 is sealed to the receptacle 146 in a manner which is similar to the method employed in sealing the cover member 114 to the receptacle 115. The same female and male dies 129 and 130, respectively are also employed. As indicated above, the flanges 149, 158 in the container B″ are longer than the same flanges in the container B′. When the two dies 129, 130 are forced together, the flanges 149, 158 are urged upwardly into the groove 150. In the case of the container B′, the flanges were substantially vertically disposed so that in effect, the flanges were U-shaped after the sealing operation. In the case of the container B″, the flanges 149, 158 being substantially longer, are bent over so that they are substantially horizontally disposed. In effect, the free terminal portions of the flanges 149, 158 are rotated approximately 270° and the free ends thereof point toward the vertical portions of the flanges 149, 158.

Again, it should be recognized that the two flanges 149, 158 are not fused through a heat sealing operation. It is the pressure applied to the cover member in combination with the heat causing both of the flanges to become readily deformable which causes each of the flanges to curl in the form of this annular rectangular bead. However, it should be recognized that the bead nevertheless provides a fluid-tight seal between the cover member 145 and the receptacle 146. It is to be noted by reference to FIGURE 20 that both of the flanges 149, 158 are turned inwardly and curled, and this curl forms a mechanical air-tight connection between each of the sections. The bead between the two sections is substantially rectangular in transverse cross section and thereby affords a smooth substantially round free edge having the advantage of affording an especially pleasing finished appearance and which is comfortable when grasped by a user's fingers.

It will be appreciated by those skilled in the art that although the method of the present invention and the dies set forth herein are designed to seal cover members to receptacles of the type disclosed herein, this is really by way of illustration and not by way of limitation and that the present invention is also well adapted for the production of other containers which have separate nestable portions.

It should be understood that changes and modifications in the form, construction, arrangement and combination of parts presently described and pointed out may be made and substituted for those herein shown without departing from the nature and principle of our invention.

Having thus described our invention, what we desire to claim and secure by Letters Patent is:

1. A thin-walled thermoformed plastic container comprising first and second cooperating sections, each being formed entirely of a synthetic resin and which are joined into a unitary structure by forcing said sections together under heat and pressure, each of said sections having open communicating ends, each of said communicating ends being defined by an annular rim, each of said first and second sections having a projected annular flange formed with the rims, the annular flange on said first section forming a groove opening away from said second section, the annular flange on said second section being sized to frictionally engage the flange on said first section, each of said flanges having reversely bent portions which extend into said groove to form an annular bead around said container, said reversely bent portions including vertically disposed and straight sections which are upwardly struck in said groove so that they are substantially parallel to the flange on said first section, said flanges and associated reversely bent portions forming a substantial U-shape in vertical cross section, said flanges and reversely bent portions being frictionally engageable with each other for their entire length, said bead forming an air-tight frictional seal between said first and second sections thereby mechanically sealing said first and second sections in a unitary structure.

2. The container of claim 1 further characterized in that the reversely bent portion of said second section frictionally engages the body portion of said first section.

3. The container of claim 2 further characterized in that the reversely bent portion of said first section is spaced from the flange of said first section by a distance which is approximately equal to the thickness of said reversely bent portion.

4. A thin-walled thermoformed plastic container comprising first and second cooperating sections, each being formed entirely of a synthetic resin and which are joined into a unitary structure by forcing said sections together under heat and pressure, each of said sections having open communicating ends, each of said communicating ends being defined by an annular rim, each of said first and second sections having a projected annular flange formed with the rims, the anular flange on said first section forming a groove opening away from said second section, the annular flange on said second section being sized to frictionally engage the flange on said first section, and having a reversely bent portion extended into said groove in the provision of an air-tight frictional seal between said first and second sections, the flange formed with the rim on said first section remaining relatively straight and uncurled, said last-named flange extending in a direction substantially parallel to the body portion of said first section and being spaced from the body portion of said first section by a distance of approximately twice the thickness of the flange on said second section, the reversely bent portion extending into said groove so that it is parallel to the flange on said first section, said reversely bent portion and flange on said second section forming a U-shaped element which frictionally engages opposite sides of the flange on said first section, said reversely bent portion being spaced from the body portion of said first section by a distance at least equal to said reversely bent portion, thereby mechanically sealing said first and said second sections in a unitary structure.

5. The plastic container of claim 4 further characterized in that the container is substantially circular in horizontal cross section and the rim on each of said sections extends laterally from the body portions thereof.

6. A thin-walled thermoformed plastic container comprising first and second cooperating sections, each being formed entirely of a synthetic resin and which are joined into a unitary structure by forcing said sections together under heat and pressure, each of said sections having open communicating ends, each of said communicating ends being defined by an annular rim, each of said first and second sections having a projected annular flange formed with the rims, the annular flange on said first section forming a groove opening away from said second section, the annular flange on said second section being sized to frictionally engage the flange on said first section, and having a reversely bent portion extended into said groove in the provision of an air-tight frictional seal between said first and second sections, said reversely bent portion being bent upwardly in said groove so that it is substantially parallel to the flange on said first section and frictionally engages the interior surface of the flange of said first section, the flange on said first section and said reversely bent portion being relatively flat and substantially vertically disposed, the reversely bent portion being spaced from the exterior wall of said first section, and thereby mechanically sealing said first and said second sections in a unitary structure.

7. A thin-walled thermoformed plastic container comprising first and second cooperating sections, each being formed entirely of a synthetic resin and which are joined by holding said second section on said first section under heat and positive force to form a unitary structure, each of said sections being non-circular in horizontal cross-section and having a body portion formed of a plurality of relatively flat side walls, each of said body portions having open communicating ends, a rim extending laterally from each of said body portions at the open communicating ends, a flange formed with the rim on said first section and remaining relatively straight and uncurled, said flange being spaced from the body portion thereof, thereby forming an annular groove on said first section, reinforcing groove forming means formed with the rim of said second section, an annular flange formed with the reinforcing groove forming means and being disposed about the annular flange of said first section, said reinforcing groove forming means being engageable against the interior surface of the body portion of said first section, and a reversely bent portion formed with the flange of said second section, said reversely bent portion extending into the groove of said first section to form an annular bead around said container, said bead creating an air-tight frictional seal between said first and second sections, the flange formed with the rim on said first section extending in a direction substantially parallel to the body portion of said first section and being spaced from the body portion of said first section by a distance of approximately twice the thickness of the flange on said second section, the reversely bent portion extending into said groove so that it is parallel to the flange on said first section, said reversely bent portion and flange on said second section forming a U-shaped element which frictionally engages opposite sides of the flange on said first section, said reversely bent portion being spaced from the body portion of said first section by a distance at least equal to the thickness of said reversely bent portion, and thereby mechanically sealing said first and second sections in a unitary structure.

8. The plastic container of claim 7 further characterized in that the annular bead disposed about the reinforcing groove forming means has substantially the same height and vertical dimension as said reinforcing groove forming means.

9. A thin-walled thermoformed plastic container comprising first and second cooperating sections, each being formed entirely of a synthetic resin and which are joined into a unitary structure by forcing said sections together under heat and pressure, each of said sections having open communicating ends, each of said communicating ends being defined by an annular rim, each of said first and second sections having a projected annular flange formed with the rims, the annular flange on said first section forming a groove opening away from said second section, the annular flange on said second section being sized to frictionally engage the flange on said first section, each of said flanges having reversely bent portions which extend into said groove to form an annular bead around said container, said flanges and associated reversely bent portions being upwardly struck in a substantially vertical position and having terminal portions which are bent in a substantially horizontal position, said terminal portions terminating in a direcHon facing the unbent portions of the flanges, said flanges and reversely bent portions being frictionally engageable with each other for their entire length, said bead forming an air-tight frictional seal between said first and second sections thereby mechanically sealing said first and second sections in a unitary structure.

10. The container of claim 9 further characterized in that the reversely bent portion of said second section frictionally engages the body portion of said first section and the underside of the rim of said first section.

11. The container of claim 10 further characterized in that the reversely bent portion of said first section is spaced from the flange of said first section by a distance which is at least equal to the thickness of said reversely bent portion.

12. A thin-walled thermoformed plastic container comprising first and second cooperating sections, each being formed entirely of a synthetic resin and which are joined by holding said second section on said first section under heat and positive force to form a unitary structure, each of said sections being non-circular in horizontal cross-section and having a body portion formed of a plurality of relatively flat side walls, each of said body portions having open communicating ends, a rim extending laterally from each of said body portions at the open communicating ends, a flange formed with the rim on said first section, said flange being spaced from the body portion thereof, thereby forming an annular groove on said first section, reinforcing groove forming means formed with the rim of said second section, an annular flange formed with the reinforcing groove forming means and being disposed about the annular flange of said first section, said reinforcing groove forming means being engageable against the interior surface of the body portion of said first section, and a reversely bent portion formed with the flange of said second section, said reversely bent portion extending upwardly into the groove of said first section so that it is substantially parallel to the flange on said first section and frictionally engages the flange of said first section, the flange on said first section and said reversely bent portion being relatively flat and substantially vertically disposed, the reversely bent portion being spaced from the exterior wall of said first section to form an annular bead around said container, said bead creating an air-tight frictional seal between said first and second sections, and thereby mechanically sealing said first and second sections in a unitary structure.

13. The plastic container of claim 12 further characterized in that said container is substantially square in horizontal cross-section.

14. The plastic container of claim 12 further characterized in that said reinforcing groove is U-shaped.

15. The plastic container of claim 12 further characterized in that each of said sections is formed with four relatively flat side walls which are joined together along the longitudinal margins thereof to form the body sections which are substantially rectangular in horizontal cross-section, said reinforcing groove forming means having four sections which are joined along their longitudinal margins, each being formed with one of the flat walls of said second section, each of the sections of the reinforcing groove forming means being engageable against one of the flat walls of the first section when the first and second sections are joined.

16. The plastic container of claim 12 further characterized in that the container is substantially rectangular in horizontal cross section and the rim on each of said sections extends laterally from the body portions thereof.

17. A thin-walled thermoformed plastic container comprising first and second cooperating sections, each being formed entirely of a synthetic resin and which are joined by holding said second section on said first section under heat and positive force to foam a unitary structure, each of said sections being non-circular in horizontal cross-section and having a body portion formed of a plurality of relatively flat side walls, each of said body portions having open communicating ends, a rim extending laterally from each of said body portions at the open communicating ends, a flange formed with the rim on said first section, said flange being spaced from the body portion thereof, thereby forming an annular groove on said first section, reinforcing groove forming means formed with the rim of said second section, an annular flange formed with the reinforcing groove forming means and being disposed about the annular flange of said first section, said reinforcing groove forming means being engageable against the interior surface of the body portion of said first section, and reversely bent portions formed with each of said flanges which extend into said groove to form an annular bead around said container, said flanges and associated reversely bent portions being upwardly struck in a substantially vertical position and having terminal portions which are bent in a substantially horizontal position, said terminal portions terminating in a direction facing the unbent portions of the flanges, said flanges and reversely bent portions being frictionally engageable with each other for their entire length, said bead forming an air-tight frictional seal between said first and second sections thereby mechanically sealing said first and second sections in a unitary structure.

18. The container of claim 17 further characterized in that the reversely bent portion of said second section frictionally engages the body portion of said first section and the underside of the rim of said first section.

19. The container of claim 18 further characterized in that the reversely bent portion of said first section is spaced from the flange of said first section by a distance which is at least equal to the thickness of said reversely bent portion.

20. A thin-walled thermoformed plastic container comprising first and second cooperating sections, each being formed entirely of a styrene-butadiene rubber and which are joined into a unitary structure by forcing said sections together under heat and pressure, each of said sections having open communicating ends, each of said communicating ends being defined by an annular rim, each of said first and second sections having a projected annular flange formed with the rims, the annular flange on said first section forming a groove opening away from said second section, the annular flange on said second section being sized to frictionally engage the flange on said first section, and having a reversely bent portion extended into said groove in the provision of an air-tight frictional seal between said first and second sections and thereby mechanically seal said first and said second sections in a unitary structure.

21. A thin-walled thermoformed plastic container comprising first and second cooperating sections, each being formed entirely of a styrene-butadiene rubber and which are joined into a unitary structure by forcing said sections together under heat and pressure, each of said sections having open communicating ends, each of said communicating ends being defined by an annular rim, each of said first and second sections having a projected annular flange formed with the rims, the annular flange on said first section forming a groove opening away from said second section, the annular flange on said second section being sized to frictionally engage the flange on said first section, each of said flanges having reversely bent portions which extend into said groove to form an annular bead around said container, said bead forming an air-tight frictional seal between said first and second sections thereby mechanically sealing said first and second sections in a unitary structure.

22. A thin-walled thermoformed plastic container comprising first and second cooperating sections, each being formed entirely of a styrene-butadiene rubber and which are ultimately joined by holding said second section on said first section under positive force and mechanically locking said first and second sections to form a unitary structure, each of said sections initially having a body portion formed by annular side wall means and each initially having an open communicating end, each of said communicating ends being defined by a rim which extends laterally from each said body portion, the rim of said first section supportively engaging the opposed surface of the rim of said second section when said first and second sections are ultimaetly joined, said first section initially having a flange formed with said rim and extending in a direction substantially parallel to the body portion of said first section, said last named flange being spaced from the body portion of said first section and thereby forming an annular groove which opens in a direction away from said second section, said second section initially having an annular flange which is formed with its rim and has a portion thereof which is capable of projecting into said groove and being permanently disposed therein, the annular flanges on said first and second sections having the proper thickness to be deformable upon the application of pressure and heat, said flanges on the first and second sections being concentrically turned inwardly and curled in the form of a bead which is substantially circular in transverse cross section so that an air-tight frictional seal is formed between said flanges thereby forming a mechanical air-tight connection between said first and second section.

23. A thin-walled thermoformed plastic container comprising first and second cooperating sections, each being formed entirely of a styrene-butadiene rubber and which are joined by holding said second section on said first section under heat and positive force to form a unitary structure, each of said sections being non-circular in horizontal cross-section and having a body portion formed of a plurality of relatively flat side walls, each of said body portions having open communicating ends, a rim extending laterally from each of said body portions at the open communicating ends, a flange formed with the rim on said first section, said flange being spaced from the body portion thereof, thereby forming an annular groove on said first section, reinforcing groove forming means formed with the rim of said second section, an annular flange formed with the reinforcing groove forming means and being disposed about the annular flange of said first section, said reinforcing groove forming means being engageable against the interior surface of the body portion of said first section, and a reversely bent portion formed with the flange of said second section, said reversely bent portion extending into the groove of said first section to form an annular bead around said container, said bead creating an air-tight frictional seal between said first and second sections, and thereby mechanically seal said first and second sections in a unitary structure.

24. A thin-walled thermoformed plastic container comprising first and second cooperating sections, each being formed entirely of a styrene-butadiene rubber and which are joined by holding said second section on said first section under positive force and mechanically locking said first and second sections to form a unitary structure, each of said sections having a body portion, a side wall and an open communicating end, a rim extending laterally from the body portion of said first section along the open end thereof, a flange formed with the rim of said first section and extending in a direction substantially parallel to the body portion of said first section, said last named flange being spaced from the body portion of said first section thereby forming an annular groove, an intermediate wall formed with said second section, a reinforcing channel formed with said intermediate wall and opening in a direction away from said first section, said reinforcing channel having a pair of vertically spaced walls, the outermost of which bears snugly against the interior surface of the body portion of said first section, a laterally extending rim extending outwardly from the outermost wall of said reinforcing channel, the interiorly presented surface of the rim on said second section being in facewise contact with the interiorly presented surface of the rim on said first section, and an annular flange extending from the periphery of the rim on said second section and in a direction away from said second section, the interior surface of said last named flange being in facewise engagement with the exterior surface of the flange on said first section, the annular flanges on said first and second sections having the proper thickness to be deformable upon the application of pressure and heat to said sections, said flange on said second section being turned inwardly and curled, the flange of said second section having a reversely formed portion which extends into the groove of said first section in the form of an annular bead, said bead creating an air-tight frictional seal between said sections and thereby forming a mechanical air-tight connection between said first and second sections, said annular bead being annularly disposed about said reinforcing groove forming means and being slightly larger in vertical dimension than said reinforcing groove forming means.

25. A thin-walled thermoformed plastic container comprising first and second cooperating sections, each being formed entirely of a styrene-butadiene rubber and which are joined by holding said second section on said first section under heat and positive force to form a unitary structure, each of said sections being non-circular in horizontal cross-section and having a body portion formed of a plurality of relatively flat side walls, each of said body portions having open communicating ends, a rim extending laterally from each of said body portions at the open communicating ends, a flange formed with the rim on said first section, said flange being spaced from the body portion thereof, thereby forming an annular groove on said first section, reinforcing groove forming means formed with the rim of said second section, an annular flange formed with the reinforcing groove forming means and being disposed about the annular flange of said first section, said reinforcing groove forming means being engageable against the interior surface of the body portion of said first section, and reversely bent portions formed with each of said flanges which extend into said groove to form an annular bead around said container, said bead forming an air-tight frictional seal between said first and second sections thereby mechanically sealing said first and second sections in a unitary structure.

(References on following page)

References Cited

UNITED STATES PATENTS

| | | | |
|---|---|---|---|
| 2,099,055 | 11/1937 | Ferngren | 215—1 |
| 2,325,922 | 8/1943 | Sebell | 229—5.6 X |
| 2,327,731 | 8/1943 | McClary | 220—67 X |
| 2,455,737 | 12/1948 | Coyle | 229—5.6 X |
| 2,606,586 | 8/1952 | Hill | 150—.5 |
| 2,777,601 | 1/1957 | Cheeley | 220—67 |
| 2,782,909 | 2/1957 | McNamara | 150—.5 |
| 2,894,844 | 7/1959 | Shakman | 220—66 X |
| 3,162,348 | 12/1964 | Galbierz et al. | 229—5.6 |
| 3,216,874 | 11/1965 | Brown | 264—249 X |
| 3,268,145 | 8/1966 | Bauer | 229—5.6 |

DONALD F. NORTON, *Primary Examiner.*

U.S. Cl. X.R.

150—5; 220—67; 215—1